(12) United States Patent
Takano et al.

(10) Patent No.: US 7,620,418 B2
(45) Date of Patent: *Nov. 17, 2009

(54) BASE STATION TRANSMISSION CONTROL METHOD, CELLULAR SYSTEM AND BASE STATION

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 11/759,854

(22) Filed: Jun. 7, 2007

(65) Prior Publication Data

US 2007/0232346 A1 Oct. 4, 2007

Related U.S. Application Data

(63) Continuation of application No. 11/452,936, filed on Jun. 15, 2006, now Pat. No. 7,269,438.

(51) Int. Cl.
*H04B 7/00* (2006.01)

(52) U.S. Cl. .......................... 455/522; 455/420; 455/69

(58) Field of Classification Search ................ 455/69, 455/13.4, 522, 115, 507, 524, 525, 115.1, 455/56.1, 422, 63, 436, 67.4, 420, 561, 571; 370/335, 342, 318, 317

See application file for complete search history.

(56) References Cited

U.S. PATENT DOCUMENTS

| 5,487,174 | A | 1/1996 | Persson |
| 5,652,752 | A | 7/1997 | Suzuki et al. |
| 5,682,602 | A | 10/1997 | Walker et al. |
| 5,812,938 | A | 9/1998 | Gilhousen et al. |
| 5,864,760 | A * | 1/1999 | Gilhousen et al. ........... 455/442 |
| 5,884,187 | A | 3/1999 | Ziv et al. |
| 6,160,999 | A | 12/2000 | Chheda et al. |
| 6,347,220 | B1 | 2/2002 | Tanaka et al. |

(Continued)

FOREIGN PATENT DOCUMENTS

JP 11-069416 A 3/1999

(Continued)

OTHER PUBLICATIONS

"3rd Generation Partnership Project; Technical Specification Group Radio Access Network; Physical Layer Procedures (FDD)", 2000, 3GPP TS 25.214 V3.5.0.

*Primary Examiner*—Tan Trinh
(74) *Attorney, Agent, or Firm*—Sughrue Mion, PLLC

(57) ABSTRACT

When performing base station selection type transmission power control, transmission of the dedicated physical control channel signal by non-transmitting base stations is halted while minimizing the impact on uplink transmission power control. This decreases downlink interference and increases downlink channel capacity. At a base station, reception quality measuring unit 506 compares the measured uplink reception quality with a target quality, forms a TPC signal on the basis of the results of this comparison, and communicates the contents of this TPC signal to transmission power controller 507. When the base station in question is a non-transmitting base station, transmission power controller 507 transmits the dedicated physical control channel signal only if the contents of the communicated TPC signal instruct a decrease, and otherwise halts transmission of the dedicated physical control channel signal.

5 Claims, 10 Drawing Sheets

U.S. PATENT DOCUMENTS

| | | |
|---|---|---|
| 6,542,488 B2 * | 4/2003 | Walton et al. ............... 370/335 |
| 6,643,272 B1 | 11/2003 | Moon et al. |
| 7,031,740 B2 | 4/2006 | Lundby et al. |
| 7,286,499 B2 * | 10/2007 | Tiedemann, Jr. ............ 370/318 |
| 2002/0055367 A1 | 5/2002 | Hamabe et al. |
| 2002/0132628 A1 | 9/2002 | Matsumoto et al. |
| 2002/0138229 A1 | 9/2002 | Wilborn et al. |
| 2002/0145991 A1 | 10/2002 | Miya et al. |
| 2002/0193115 A1 | 12/2002 | Furukawa et al. |
| 2004/0152483 A1 | 8/2004 | Furukawa |
| 2005/0054366 A1 | 3/2005 | Chen et al. |
| 2008/0102878 A1 * | 5/2008 | Tiedemann, Jr. ............ 455/522 |

FOREIGN PATENT DOCUMENTS

| | | |
|---|---|---|
| JP | 11-122654 | 4/1999 |
| JP | 11-308657 | 11/1999 |

* cited by examiner

BASE STATION TRANSMISSION CONTROL METHOD, CELLULAR SYSTEM AND BASE STATION

This is a continuation of application Ser. No. 10/066,766 filed Feb. 6, 2002, which claims priority from Japanese Patent Application No. 036962/2001, filed Feb. 14, 2006, the entire disclosures of which are hereby incorporated by reference.

BACKGROUND OF THE INVENTION

1. Field of the Invention

This invention relates to a base station transmission control method, a cellular system and a base station. It relates in particular to a base station transmission control method, and to a cellular system and a base station, for controlling the transmission of base station control signals during handover in a cellular system.

2. Description of Related Art

A cellular system employing direct sequence code division multiple access (DS-CDMA) uses the same frequency band in a plurality of channels. As a result, from the point of view of a given channel, radio waves in other channels constitute interference, and an increase in the power of this interference can result in a deterioration of reception quality for the desired signal, and in the connection being dropped, etc. Hence the number of channels through which communication can be sustained at the required reception quality, in other words, the channel capacity, is dependent on the amount of interference. In the uplink, a signal transmitted by a mobile station located far from a base station undergoes more attenuation than a signal transmitted by a mobile station located near that base station, and hence transmitting such signals at the same power gives rise to the near-far effect in which the interfering signal becomes stronger than the desired signal and communication becomes difficult. Transmission power control is therefore an essential technique for uplink channels, where it involves controlling the transmission power of the mobile stations so that their signals are received at a base station at the same received power.

Although a near-far effect of this sort does not occur for downlink channels, in order to reduce interference to other channels, transmission power control is performed at base stations so that transmission power is kept at the minimum necessary for mobile stations to maintain the required reception quality. Control of transmission power at the base stations is based on closed-loop control. This involves comparing the measured reception quality with a prescribed target quality, and if it is found to be higher than the target quality, a transmission power control (TPC) signal instructing that transmission power be decreased is transmitted, while if the measured reception quality is found to be lower than the target quality, a TPC signal instructing that transmission power be increased is transmitted.

Customarily, a technique called soft handover is used in a cellular system employing CDMA. Soft handover involves transmitting from a plurality of base stations to which a mobile station is connected simultaneously, and is employed when a mobile station approaches the vicinity of a cell boundary and the difference between the propagation loss experienced by the signal received from the base station to which the mobile station is connected and the propagation loss experienced by the signal received from a neighbouring base station falls within a prescribed threshold. Due to the diversity effect obtained by transmitting from a plurality of base stations, soft handover results in improved reception quality when a mobile station is near a cell boundary, where propagation loss is large and reception quality tends to deteriorate. Because soft handover sets up a connection to a base station which is the candidate for the next connection before the connection to the active base station is released, handover is smooth and without any momentary loss of signal. Because a mobile station is generally at a different distance from each of several base stations, each of these base stations sees a different uplink reception quality during soft handover. Hence in the IMT-2000 standard, for example, during soft handover each base station notifies the base station controller of the reception quality of the signal obtained by RAKE combining, whereupon selection combining is performed using the signal with the highest reception quality as the desired signal. Uplink transmission power control in the IMT-2000 standard therefore involves comparing the uplink reception quality at each base station with a prescribed target reception quality, forming TPC signals on the basis of these results, and transmitting these TPC signals to the mobile station. If even one of the plurality of TPC signals received at the mobile station instructs a decrease in transmission power, the mobile station decreases its transmission power, while if all the TPC signals instruct an increase in transmission power, the mobile station increases its transmission power. This provides transmission power control that reduces any excess uplink transmission power while satisfying the required reception quality.

On the other hand, a problem encountered in the downlink is that because a plurality of base stations are transmitting during soft handover, there is an increase in interference and hence a decrease in channel capacity. As a solution to this problem, JP H11-069416 A discloses a technique for restricting the base stations that transmit during soft handover, which serves to decrease the downlink interference. Specifically, base stations transmit a pilot signal at a prescribed power, and the mobile station measures the reception quality of the pilot signals transmitted by those base stations that have set up a connection. The base station with the highest reception quality is taken as the transmitting base station, which is called as "primary cell", while the other base stations stop transmitting. This ensures that only base stations with low propagation loss transmit, with the result that downlink interference is decreased and channel capacity can be expected to increase.

The site selection diversity TPC (SSDT) scheme in the IMT-2000 standard applies this technique. A base station usually transmits both dedicated physical control channel signals and dedicated physical data channel signals in the downlink. In SSDT, base stations other than the transmitting base station (i.e., non-transmitting base stations) halt the transmission of dedicated physical data channel signals only, and continue to transmit dedicated physical control channel signals (3G TS 25.214 3rd Generation Partnership Project; Technical Specification Group Radio Access Network; Physical layer procedures (FDD) (Release 1999) 5.2.1.4.5). The reason for this is that, as mentioned previously, each base station that has set up a connection to the mobile station has its own TPC signal and hence even the non-transmitting base stations have to use the dedicated physical control channel to transmit these TPC signals.

However, the proportion of dedicated physical control channel signals and dedicated physical data channel signals transmitted in the downlink varies according to transmission rate and other factors. For example, at low transmission rates, the proportion of dedicated physical control channel signals becomes higher than that of dedicated physical data channel signals. An excessively high proportion of dedicated physical control channel signals results in the problem that the dedicated physical control channel signals transmitted by non-transmitting base stations will have a significant interference impact on other channels, resulting in decreased channel capacity.

It may be pointed out that not transmitting any downlink dedicated physical control channel signals at all from the non-transmitting base stations would be tantamount to not transmitting any TPC signals for controlling transmission power in the uplink, which would give rise to the problem that uplink reception quality might deteriorate.

SUMMARY OF THE INVENTION

The present invention therefore addresses itself to the task of decreasing the interference resulting from the dedicated physical control channel signals transmitted by non-transmitting base stations in the downlink while minimizing the effect of this on the uplink.

To achieve this object, the present invention provides a base station transmission control method wherein;

a mobile station sets up a connection to one or more base stations, measures the reception quality of the pilot signal transmitted therefrom, and in accordance with the results of this measurement, designates one or more of the base stations with which a connection has been set up (hereinafter termed "connected base stations") as a transmitting base station, and sends notification of this to the connected base stations;

when a connected base station has been designated as a transmitting base station, it transmits dedicated physical control channel signals and dedicated physical data channel signals to the aforementioned mobile station, measures the uplink reception quality, and transmits, multiplexed in the dedicated physical control channel signal, a transmission power control signal serving to control the transmission power of the mobile station so that the aforementioned reception quality approaches a prescribed target quality;

the mobile station receives one or more dedicated physical control channel signals transmitted from connected base stations and controls its own transmission power in accordance therewith; and when a connected base station has been designated as a non-transmitting base station, it halts transmission of the dedicated physical data channel signal and decides whether or not to transmit the dedicated physical control channel signal in accordance with the uplink reception quality.

In this base station transmission control method, it is also feasible for non-transmitting base stations to perform control in accordance with the rate of movement of the mobile station. Namely, when the movement of the mobile station is faster than a prescribed threshold, the transmission of dedicated physical control channel signals and dedicated physical data channel signals at non-transmitting base stations can be halted; and when the movement of the mobile station is slower than the prescribed threshold, the transmission of dedicated physical data channel signals from non-transmitting base stations can be halted and whether or not to transmit the dedicated physical control channel signal can be decided in accordance with the uplink reception quality.

In the cellular system of this invention;

a mobile station sets up a connection to one or more base stations, measures the reception quality of the pilot signal transmitted therefrom, and in accordance with the results of this measurement, designates one or more of the connected base stations as a transmitting base station, and sends notification of this to the connected base stations;

when a connected base station has been designated as a transmitting base station, it transmits dedicated physical control channel signals and dedicated physical data channel signals to the aforementioned mobile station, measures the uplink reception quality, and transmits, multiplexed in the dedicated physical control channel signal, a transmission power control signal serving to control the transmission power of the mobile station so that the aforementioned reception quality approaches a prescribed target quality;

the mobile station receives one or more dedicated physical control channel signals transmitted from connected base stations and controls its own transmission power in accordance therewith; and when a connected base station has been designated as a non-transmitting base station, it halts transmission of the dedicated physical data channel signal and decides whether or not to transmit the dedicated physical control channel signal in accordance with the uplink reception quality.

In this cellular system of the invention, it is also feasible for non-transmitting base stations to perform control in accordance with the rate of movement of the mobile station. Namely, when the movement of the mobile station is faster than a prescribed threshold, the transmission of dedicated physical control channel signals and dedicated physical data channel signals at non-transmitting base stations can be halted; and when the movement of the mobile station is slower than the prescribed threshold, the transmission of dedicated physical data channel signals from non-transmitting base stations can be halted and whether or not to transmit the dedicated physical control channel signal can be decided in accordance with the uplink reception quality.

A base station according to the present invention;

transmits a pilot signal at a prescribed power;

receives information relating to transmitting base stations from a mobile station which has set up a connection to one or more base stations, measured the reception quality of the pilot signal transmitted therefrom, and in accordance with the results of this measurement, designated one or more of the connected base stations as a transmitting base station, and sent notification of this to the connected base stations;

when the base station in question is a transmitting base station, it transmits dedicated physical control channel signals and dedicated physical data channel signals; and when the base station in question is a non-transmitting base station, it halts transmission of the dedicated physical data channel signal and decides whether or not to transmit the dedicated physical control channel signal in accordance with the uplink reception quality.

Alternatively, when the estimated rate of movement of the mobile station is faster than the prescribed threshold, this base station of the invention stops transmitting irrespective of uplink reception quality.

BRIEF DESCRIPTION OF THE DRAWINGS

Specific embodiments of the present invention will now be described, by way of example only, with reference to the accompanying drawings in which.

DETAILED DESCRIPTION OF THE INVENTION

Figure 1:
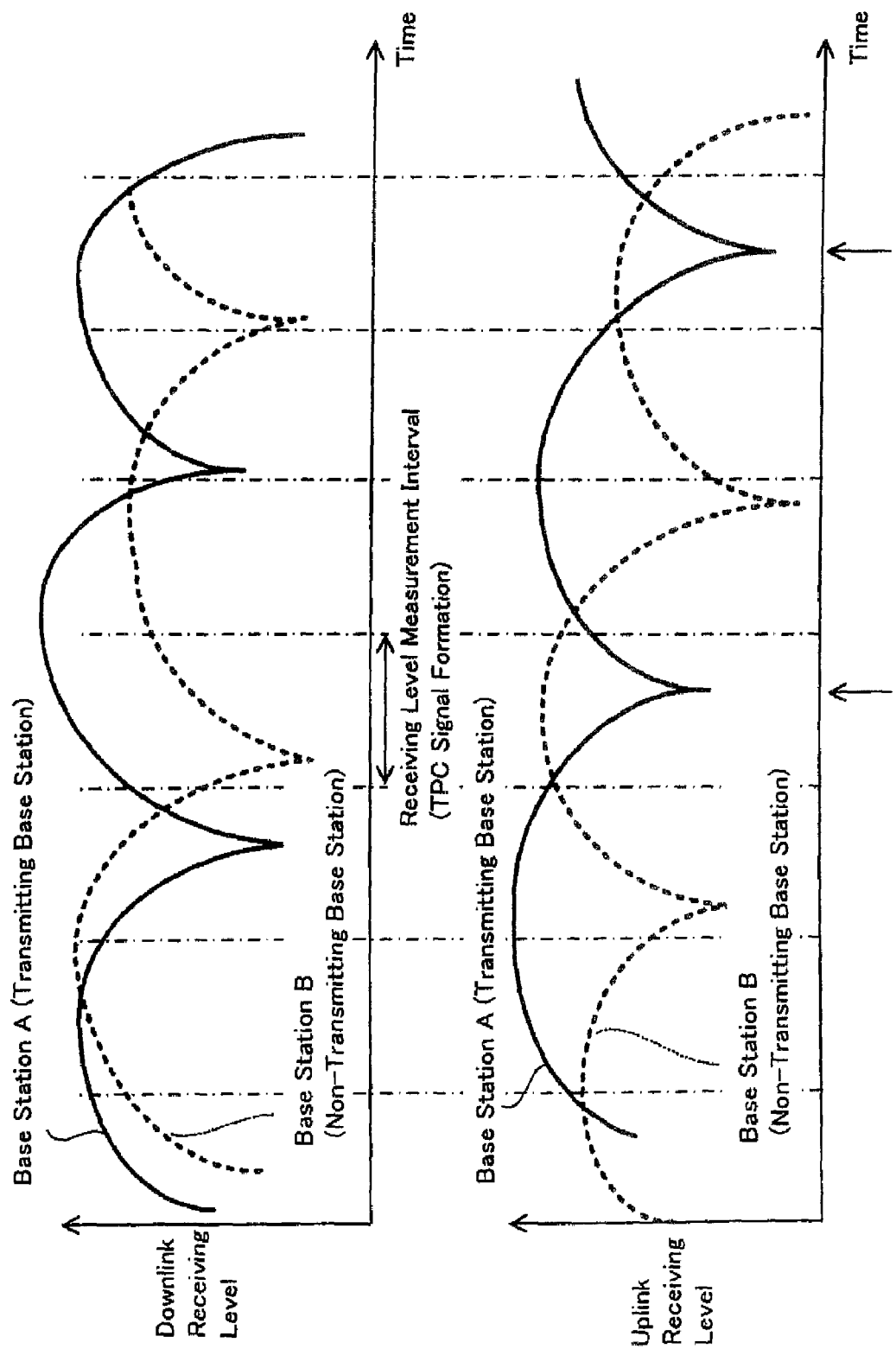
FIG. 1 shows an example of downlink and uplink receiving level fluctuations when the rate of movement of a mobile station is slow, and aids an explanation of the principles behind embodiments of this invention.

In the DS-CDMA based cellular system of the present invention, a mobile station sets up a connection to one or more base stations, measures the reception quality of a pilot signal transmitted therefrom, and in accordance with the results of this measurement, designates one or more of the base stations with which a connection has been set up (hereinafter termed "connected base stations") as a transmitting base station, and sends notification of this to the connected base stations. When a connected base station is, according to the notification from the mobile station, a transmitting base station, it transmits dedicated physical control channel signals and dedicated physical data channel signals to the mobile station. When a connected base station is a non-transmitting base station, it halts transmission of the dedicated physical data channel signal and decides whether or not to transmit the dedicated physical control channel signal in accordance with the velocity of the mobile station and the uplink reception quality.

A base station measures the uplink reception quality and transmits, multiplexed onto the downlink, a transmission power control signal for controlling the transmission power of the mobile station.

The mobile station receives one or more transmission power control signals and controls its own transmission power. Because there is a different propagation loss between the mobile station and each connected base station, there is also a different uplink reception quality at each base station. The contents of the transmission power control signal for controlling mobile station transmission power are therefore different at each base station.

In order to make transmission power in the uplink as small as possible so as to minimize interference with other users, it is preferable to transmit at a transmission power that satisfies the prescribed quality requirements at the base station with the smallest propagation loss. Hence uplink interference can be decreased by transmitting in conformity with the transmission power control signal from the base station at which uplink propagation loss is smallest.

On the other hand, a "transmitting base station" is a base station for which downlink propagation loss is small. Because there is usually no correlation between fading in the downlink and the uplink, a base station for which downlink propagation loss is minimum is not necessarily the base station at which uplink propagation loss is minimum. However, because shadowing and distance-related attenuation, which account for a large proportion of propagation loss, are the same in the uplink and the downlink, a base station for which downlink propagation loss is small has a high probability of experiencing a small propagation loss in the uplink as well.

Hence for uplink transmission power control, the transmission power control signal transmitted from a transmitting base station is important, whereas the transmission power control signal transmitted from a non-transmitting base station is of little importance. It follows that stopping transmission power control signals from non-transmitting base stations has little impact on the uplink and serves to reduce downlink interference.

As was mentioned in connection with the related art, in order to keep interference in the uplink to a minimum, transmission power control at a mobile station that has set up connections with a plurality of base stations decreases the transmission power if even a single TPC signal instructing transmission power to be decreased is received. It follows that if TPC signals instructing an increase in transmission power are not transmitted from non-transmitting base stations, the transmission power control performed at the mobile station is the same as if all the TPC signals were transmitted.

Accordingly, in the present invention a non-transmitting base station transmits the dedicated physical control channel signal only when it will be transmitting a TPC signal instructing a decrease, in other words, only when the uplink reception quality is higher than a target quality. Otherwise, the non-transmitting base station halts transmission of dedicated physical control channel signals. This technique has no impact on the uplink, and serves to decrease downlink interference and to increase downlink channel capacity.

It may be mentioned that the probability of a non-transmitting base station transmitting a TPC signal instructing a decrease differs according to the rate of movement of the mobile station. The reason for this is explained below.

A non-transmitting base station is a base station associated with a high propagation loss in the downlink. However, fading in the downlink is not correlated with fading in the uplink.

When mobile station velocity is low, as shown in FIG. 1, there will be occasions (indicated by an arrow) when a non-transmitting base station (base station B) experiences the minimum propagation loss and therefore the maximum receiving level in the uplink.

Figure 2:
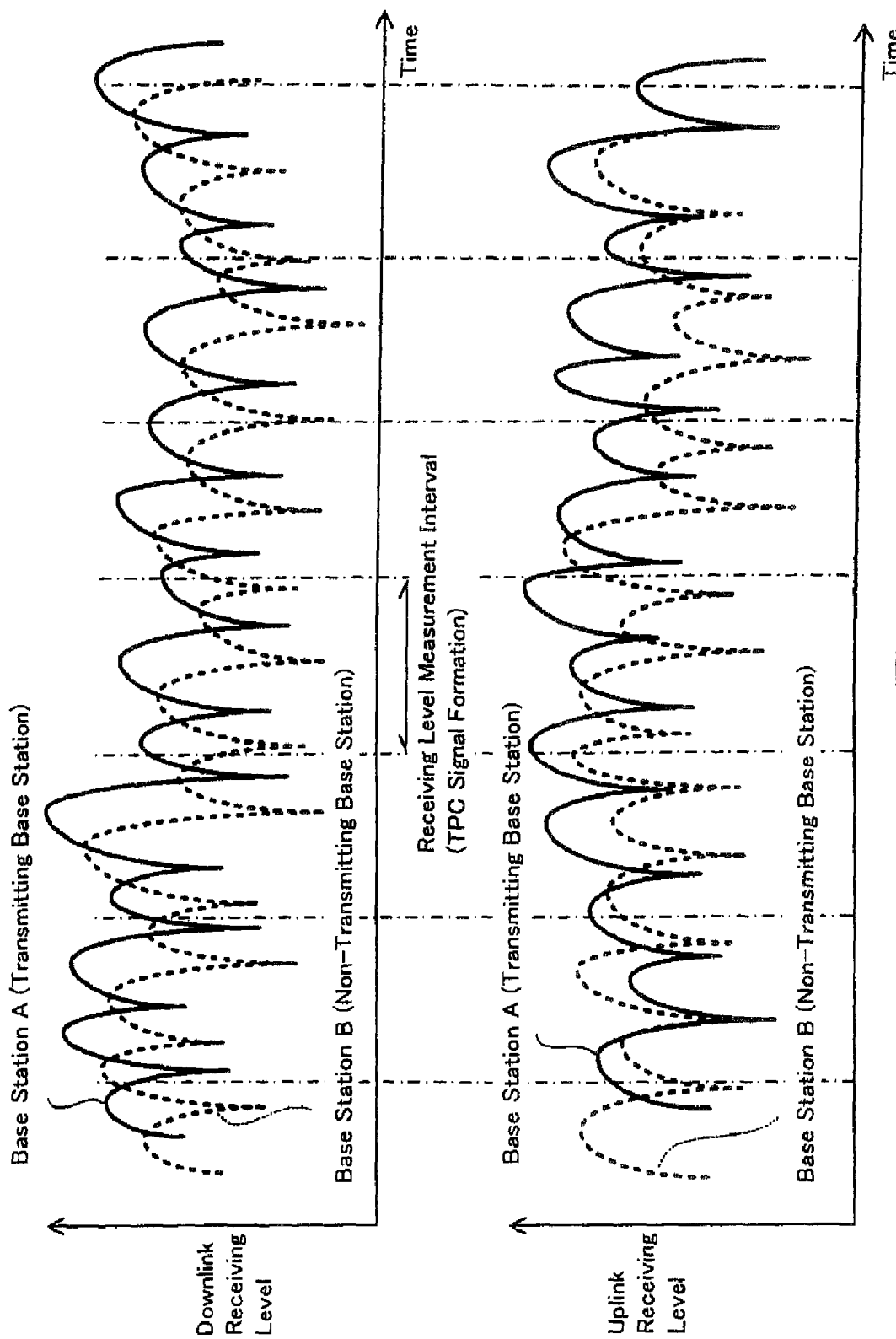
FIG. 2 shows an example of downlink and uplink receiving level fluctuations when the rate of movement of a mobile station is fast, and aids an explanation of the principles behind embodiments of this invention.

On the other hand, when mobile station velocity is high, as shown in FIG. 2, because fading is averaged within the measurement interval, the probability of a non-transmitting base station being the base station with the highest uplink receiving level is very small.

Figure 3:
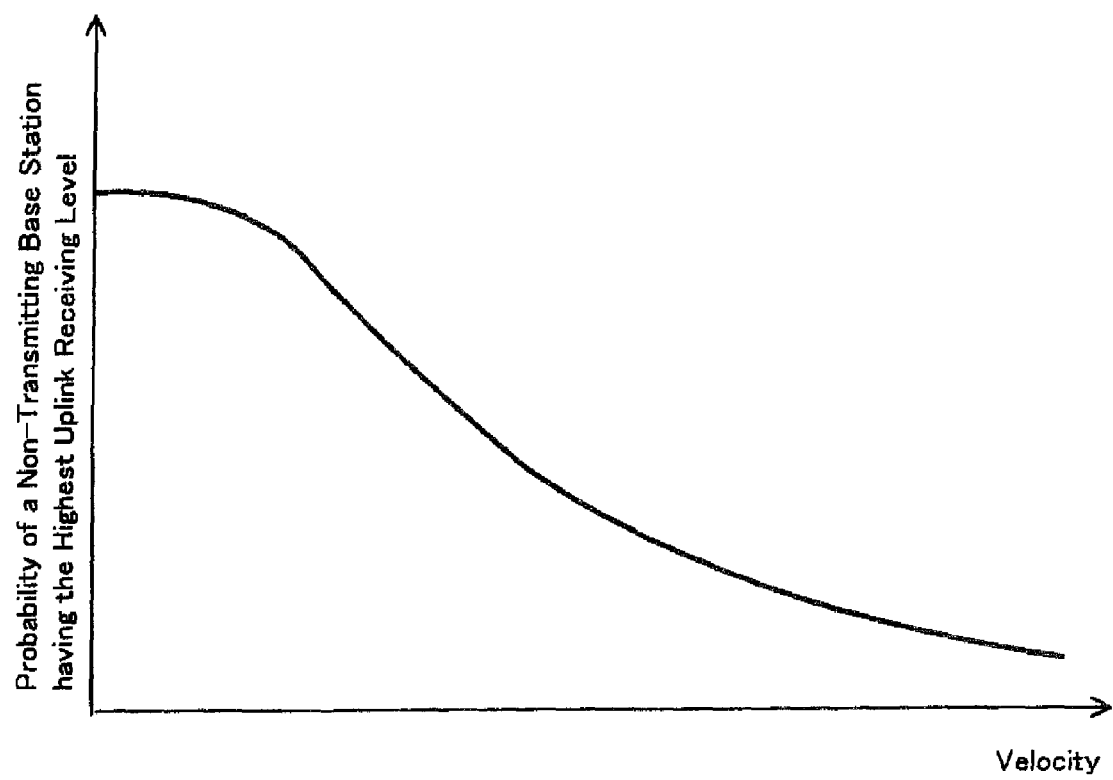
FIG. 3 shows, as a function of the rate of movement of a mobile station, the probability of a non-transmitting base station having the highest uplink receiving level, and aids an explanation of the principles behind embodiments of this invention.

Consequently, as shown in FIG. 3, the probability of a non-transmitting base station having the highest uplink receiving level decreases with increasing rate of movement of the mobile station.

Because transmission power control at a mobile station operates so as to maintain the minimum reception quality required at the base station with the highest receiving level, TPC signals instructing a decrease are naturally transmitted by the base station experiencing the highest uplink receiving level.

It follows that when the rate of movement of a mobile station is high, the probability of a non-transmitting base station transmitting a TPC signal instructing a decrease is small. Moreover, when the rate of movement of a mobile station is high, the ability of TPC signals to follow fading deteriorates and hence transmission power control itself is less effective. Consequently, when a mobile station is moving quickly, transmitting no TPC signals at all from non-transmitting base stations has little impact on the uplink.

Accordingly, in the present invention, when a mobile station is moving quickly, downlink interference can be further decreased by always halting the transmission of dedicated physical control channel signals by a non-transmitting base station.

Figure 4:
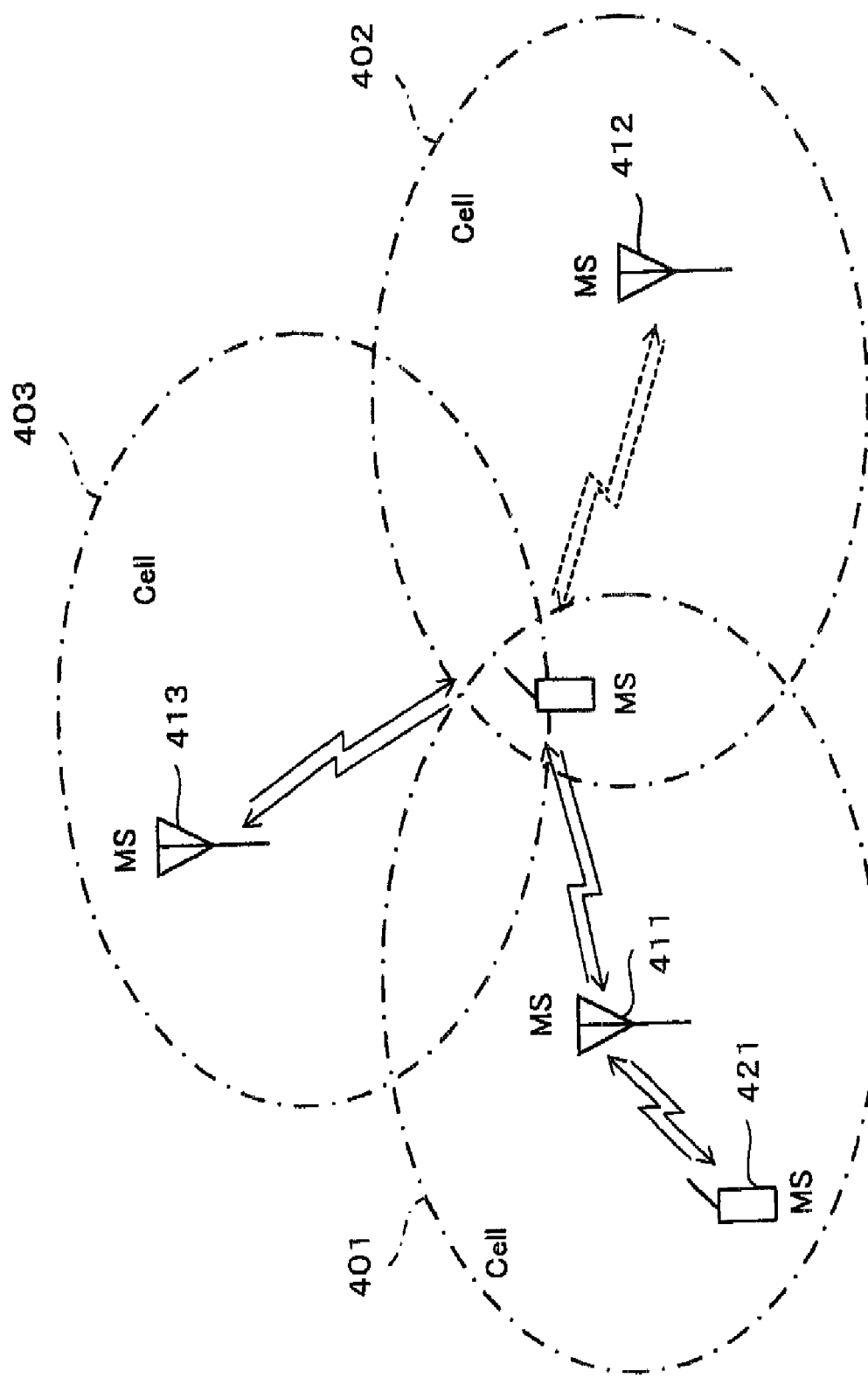
FIG. 4 shows an exemplary configuration of the cellular system of the present invention.

In FIG. 4, which shows an exemplary configuration of the cellular system of the present invention, base stations 411 to 413 transmit to mobile stations 421 and 422 located within cells 401 to 403. Each base station transmits, to all mobile stations within the cell, a common pilot signal of prescribed power. Each base station also transmits, to each mobile station within the cell, dedicated physical control channel signals and dedicated physical data channel signals. The transmission power of these signals is controlled by fast closed-loop transmission power control.

The mobile stations set up a connection to the base station whose common pilot signal has been received at the highest receiving level, and to one or more base stations whose common pilot signal has been received at a receiving level that differs from this highest receiving level by a margin that is within a prescribed threshold.

Mobile station 421 located near the centre of cell 401 sets up a connection to base station 411 and this base station alone when the following two conditions obtain: namely, when the receiving level of the common pilot signal transmitted by base station 411 is highest and when the difference between this receiving level and the receiving levels of the common pilot signals transmitted by the other base stations is not within the prescribed threshold.

Mobile station 422 is located near the boundaries of cells 401, 402 and 403, and sets up connections simultaneously to base stations 411, 412 and 413 if the differences in the receiving level of the common pilot signal transmitted by these three base stations are within a prescribed threshold.

If base station 412 is not within the threshold that determines a transmitting base station, only base stations 411 and 413 transmit dedicated physical control channel signals and dedicated physical data channel signals. In this case, base station 412 halts transmission of the dedicated physical data channel signal, and decides whether or not to transmit the dedicated physical control channel signal in accordance with the uplink reception quality.

Various modes of embodying the present invention will now be described with reference to the accompanying drawings.

FIRST EMBODIMENT

Figure 5:
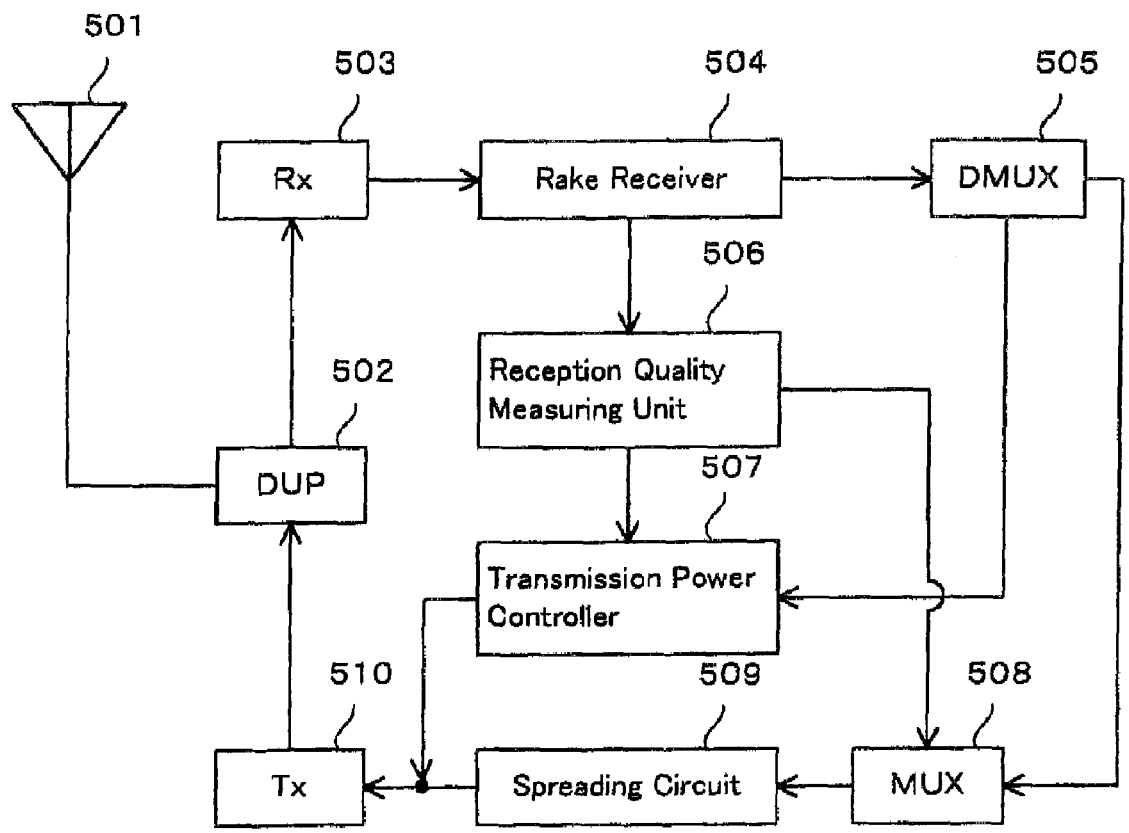
FIG. 5 is a function block diagram of a base station according to a first mode of embodying the invention.

In FIG. 5, which is a block diagram of a base station according to a first mode of embodying this invention, the base station comprises antenna 501 for receiving signals transmitted from mobile stations, duplexer 502, radio receiver 503 for converting radio signals to received baseband signals, RAKE receiver 504 for combining baseband signals, demultiplexer 505, reception quality measuring unit 506 for measuring the reception quality of the RAKE-combined received signal, transmission power controller 507 for controlling the transmission power of the base station, multiplexer 508, spreading circuit 509 for spreading the downlink signal and outputting a baseband signal for transmission, and radio transmitter 510 for converting this baseband signal to a radio signal and transmitting it.

Demultiplexer 505 separates the signal that specifies the transmitting base stations, this signal being transmitted from the mobile station at prescribed intervals, and notifies transmission power controller 507 of whether or not the local base station is a transmitting base station.

Reception quality measuring unit 506 compares the measured uplink reception quality with the target quality. If the measured reception quality is lower than the target quality, it forms a TPC signal instructing an increase, while if the measured reception quality is higher, it forms a TPC signal instructing a decrease. The TPC signal is multiplexed in the dedicated physical control channel signal by multiplexer 508.

The contents of the TPC signal formed by reception quality measuring unit 506 are communicated to transmission power controller 507. If the local base station is a non-transmitting base station, transmission power controller 507 decides whether or not to transmit the dedicated physical control channel signal in accordance with the contents of the communicated TPC signal.

Figure 6:
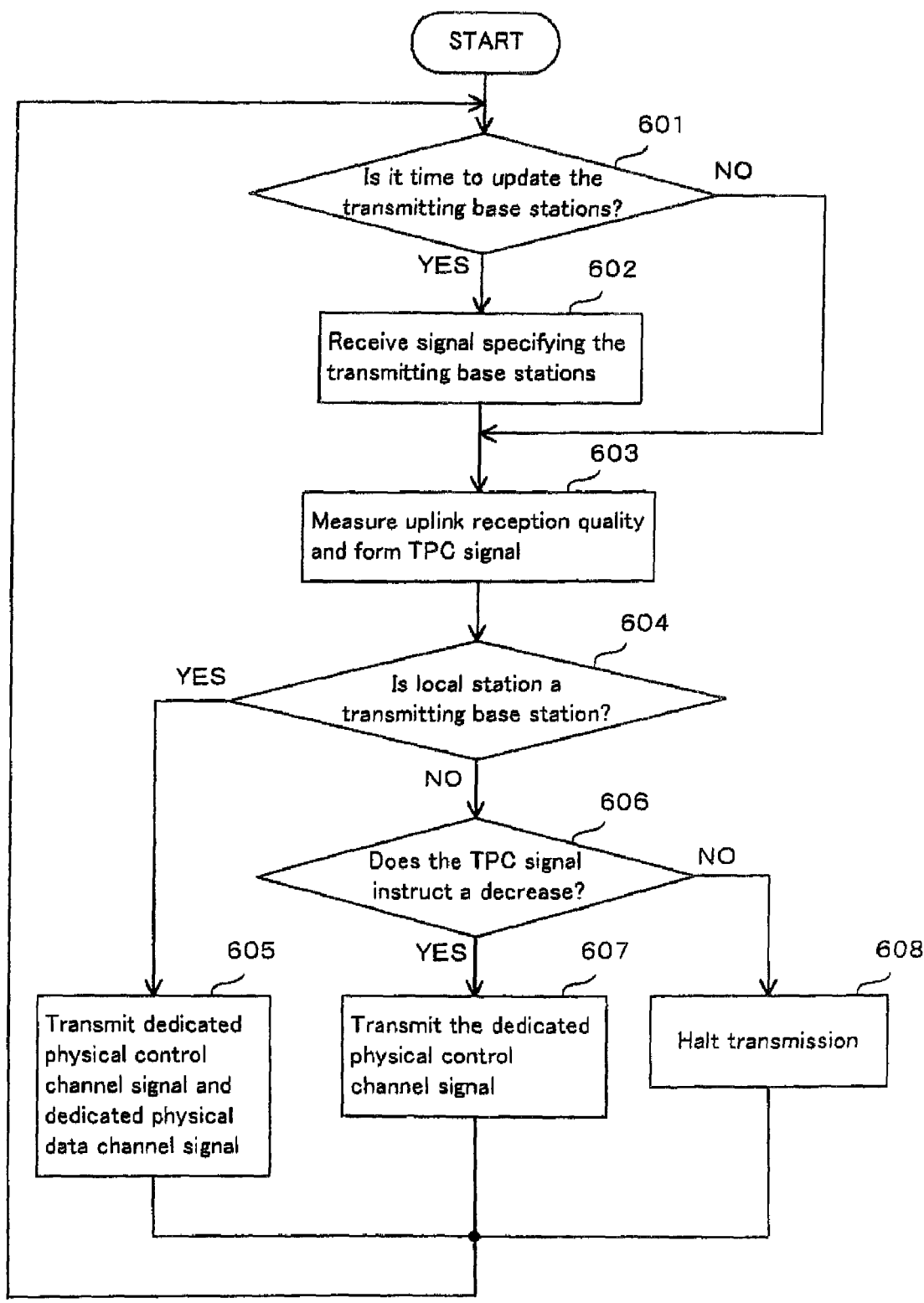
FIG. 6 is a flowchart showing the operation of a base station according to a first mode of embodying the invention.

FIG. 6 is a flowchart showing the operation of transmitting dedicated physical control channel signals and dedicated physical data channel signals from a base station according to a first mode of embodying the invention. When it is time to update the transmitting base station, the base station receives a signal that specifies the transmitting base stations, this signal being transmitted from the mobile station (Step 602). If measurement of the uplink reception quality SIRrec and comparison with the target quality SIRtrg shows that SIRrec<SIRtrg, a TPC signal instructing an increase is formed, while if the measurement and comparison shows that SIRrec>SIRtrg, a TPC signal instructing a decrease is formed (Step 603). If the local base station is a transmitting base station (Step 604, YES), it transmits the dedicated physical data channel signal and the dedicated physical control channel signal in which the TPC signal has been multiplexed (Step 605). If the local base station is a non-transmitting base station (Step 604, NO), it halts transmission of the dedicated physical data channel signal, but transmits the dedicated physical control channel signal in which the TPC signal has been multiplexed if the TPC signal instructs a decrease (Step 607). On the other hand, if the TPC signal instructs an increase, the (non-transmitting) base station stops transmitting (Step 608). The base station performs the foregoing control sequence at prescribed TPC control intervals.

As has been described above, in this mode of embodying the invention, a non-transmitting base station decides whether or not to transmit the dedicated physical control channel signal in accordance with the contents of the TPC signal for controlling uplink transmission power, this TPC signal being transmitted after being multiplexed in the downlink dedicated physical control channel signal. The transmission power control performed by the mobile station is such that it decreases its transmission power if it receives even a single TPC signal instructing a decrease. It follows that if non-transmitting base stations transmit only when the TPC signal instructs a decrease, the mobile station can perform the same transmission power control as when all the TPC signals are transmitted. Hence transmission of the dedicated physical control channel signals that non-transmitting base stations transmit on the downlink can be stopped without affecting TPC-based transmission power control in the uplink. As a result, downlink interference can be reduced and channel capacity increased.

SECOND EMBODIMENT

Figure 7:
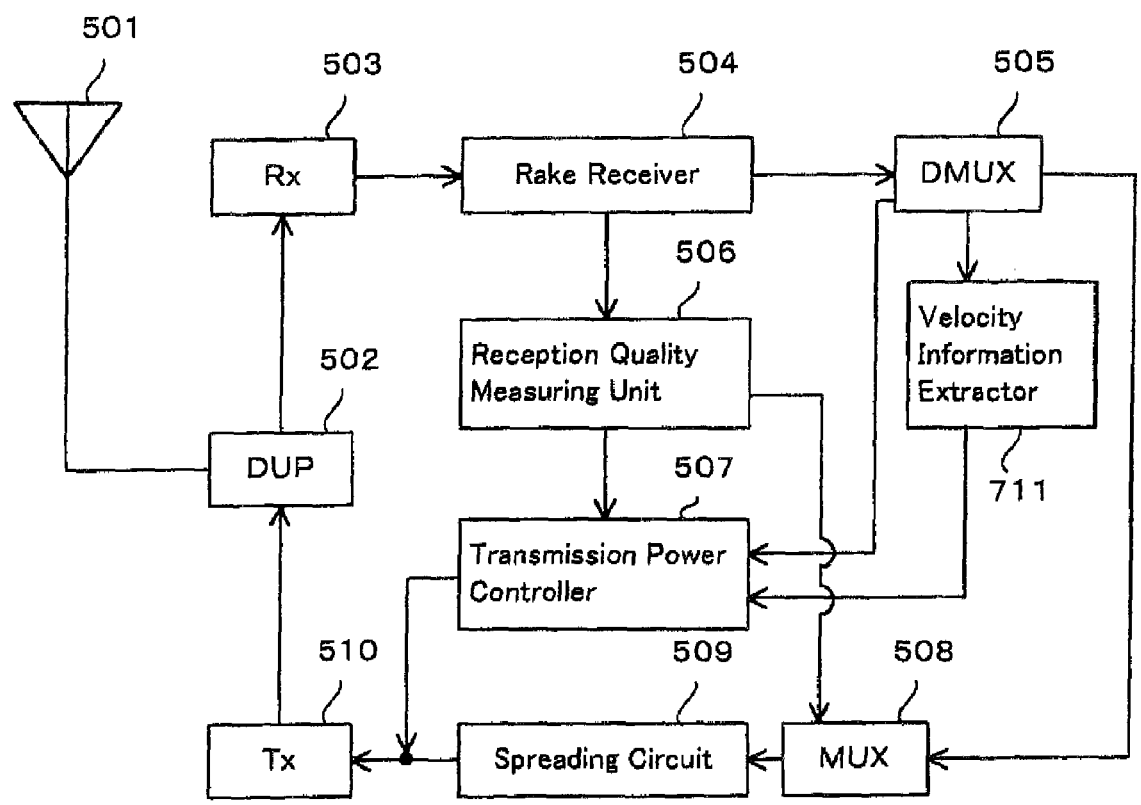
FIG. 7 is a function block diagram of a base station according to a second mode of embodying the invention.

In FIG. 7, which is a block diagram of a base station according to a second mode of embodying this invention, parts equivalent to parts in FIG. 5 have the same referencing numerals and will not be described again. The cellular system to which this embodiment is applied is the same as that depicted in FIG. 4.

A base station according to this second embodiment of the invention illustrated in FIG. 7 has velocity information extractor 711, which the base station shown in FIG. 5 did not have. In the first embodiment, when a TPC signal instructing a decrease is to be transmitted from a non-transmitting base station, that non-transmitting base station invariably transmitted the dedicated physical control channel signal, regardless of the rate of movement of the mobile station. However, in this second embodiment, the control performed by a non-transmitting base station is changed in accordance with the estimated velocity of the mobile station. Hence velocity information extractor 711 is provided to extract velocity information from the mobile station and communicate the information to the transmission power controller. This velocity information can be arranged at a prescribed location in the signal frame, or it can be carried in the signal frame together with a flag indicating that it is velocity information. The velocity information can be transmitted at prescribed intervals.

When the estimated velocity of the mobile station is higher than a prescribed threshold, transmission power controller 507 halts transmission by a non-transmitting base station regardless of the contents of the TPC signal. When the estimated velocity is less than the prescribed threshold, transmission power controller 507 performs the same operations as in the first embodiment.

The operation of the other constituent elements of the embodiment illustrated in FIG. 7 is the same as that of the base station shown in FIG. 5.

Figure 8:
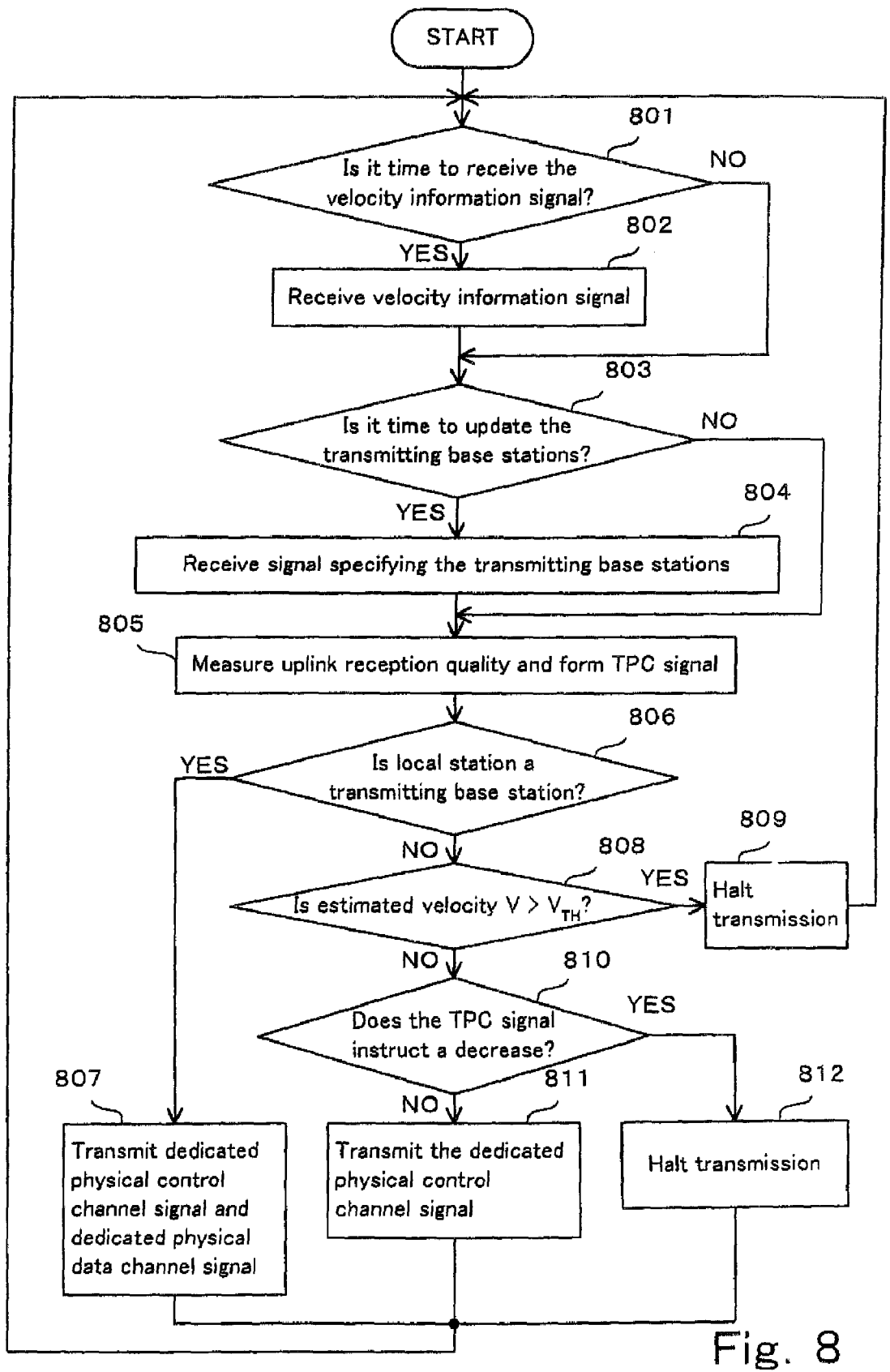
FIG. 8 is a flowchart showing the operation of a base station according to a second mode of embodying the invention.

FIG. 8 is a flowchart showing the operation of transmitting dedicated physical control channel signals and dedicated physical data channel signals from a base station according to a second mode of embodying the invention. The base station receives a velocity information signal from the mobile station, this signal being transmitted at prescribed intervals (Step 802). When it is time to update the transmitting base stations, the base station receives a signal that specifies the transmitting base stations, this signal being transmitted from the mobile station (Step 804). If measurement of the uplink reception quality SIRrec and comparison with the target quality SIRtrg shows that SIRrec<SIRtrg, a TPC signal instructing an increase is formed, while if the measurement and comparison shows that SIRrec>SIRtrg, a TPC signal instructing a decrease is formed (Step 805). If the local base station is a transmitting base station (Step 806, YES), it transmits the dedicated physical data channel signal and the dedicated physical control channel signal in which the TPC signal has been multiplexed (Step 807). If the local base station is a non-transmitting base station (Step 806, NO), the extracted estimated velocity is compared with a prescribed threshold (Step 808). If it is found to be higher than the prescribed threshold, transmission of both the dedicated physical data channel signal and the dedicated physical control channel signal is halted (Step 809). On the other hand, if the estimated velocity is lower than the prescribed threshold, transmission of the dedicated physical data channel signal is halted and the dedicated physical control channel signal is transmitted only if the TPC signal instructs a decrease (Step 811), otherwise, transmission of the dedicated physical control channel signal is halted as well (Step 812).

The base station performs the foregoing control sequence repeatedly at prescribed TPC control intervals.

Thus according to this mode of embodying the invention, transmission of dedicated physical control channel signals by a non-transmitting base station is invariably halted if the rate of movement of the mobile station is fast. If the rate of movement is fast, the probability of a base station at which uplink propagation loss is minimum also being the base station at which downlink propagation loss is minimum, is very high. As described above, it follows that the probability of a non-transmitting base station transmitting a TPC signal instructing a decrease becomes very small at high mobile station movement rates. Because the mobile station decreases its transmission power if there is at least one TPC signal that instructs a decrease, ceasing to transmit TPC signals instructing an increase from non-transmitting base stations has no impact on TPC control. Moreover, when the rate of movement of a mobile station is high, TPC control is unable to follow fading and hence TPC control itself has little effect. Consequently, when a mobile station is moving very quickly, completely halting the transmission of dedicated physical control channel signals from non-transmitting base stations has little impact on TPC control in the uplink and provides a significant decrease in downlink interference. When the rate of movement of a mobile station is slow, the non-transmitting base stations transmit only TPC signals that instruct a decrease. This results in uplink control which is the same as if all TPC signals were transmitted, and also provides the maximum possible decrease in downlink interference.

THIRD EMBODIMENT

Figure 9:
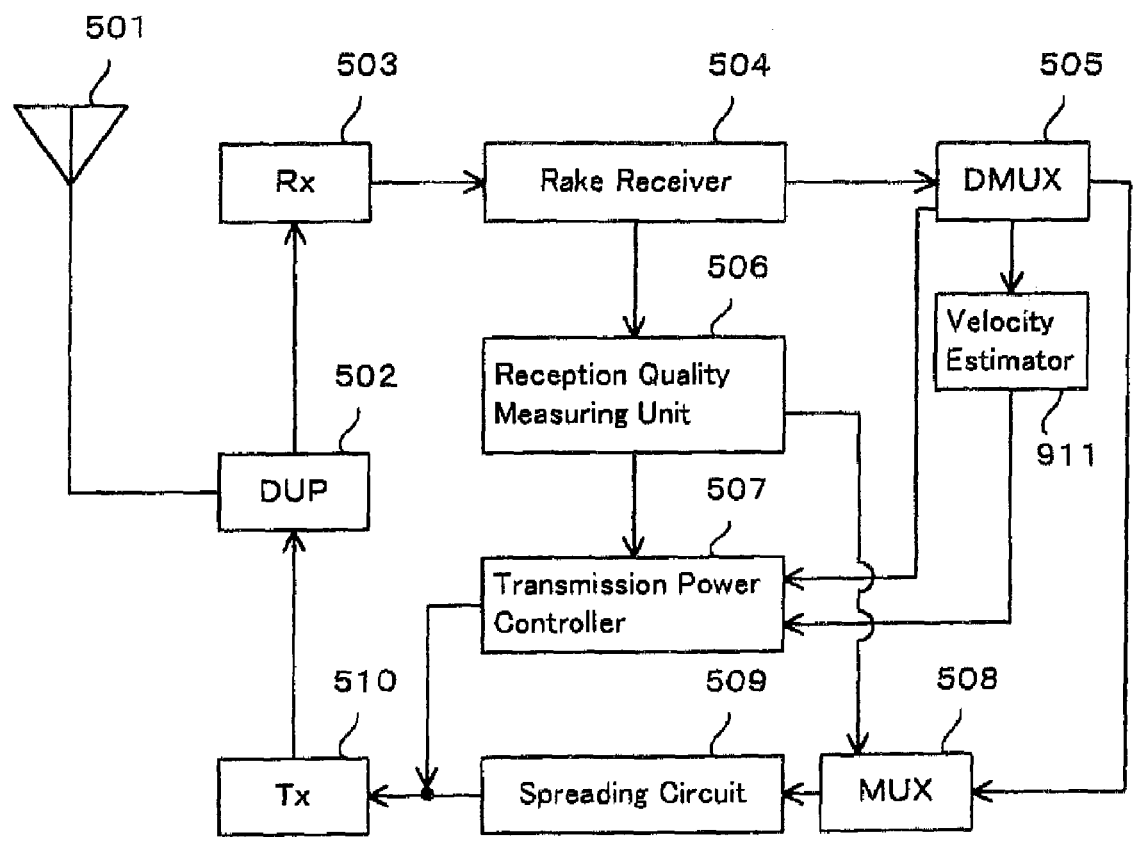
FIG. 9 is a function block diagram of a base station according to a third mode of embodying the invention.

In FIG. 9, which shows the configuration of a base station according to third mode of embodying this invention, parts equivalent to parts in FIG. 5 have the same referencing numerals and will not be described again. The cellular system to which this embodiment is applied is the same as that depicted in FIG. 4.

A base station according to this third embodiment of the invention illustrated in FIG. 9 has velocity estimator 911, which the base station shown in FIG. 5 did not have. In the second embodiment, a velocity information signal transmitted by the mobile station was extracted and the control of uplink transmission power performed by a non-transmitting base station was made dependent on this extracted velocity information signal. However, in this third embodiment, the rate of movement of the mobile station is estimated by the base station. Hence velocity estimator 911 is provided in the base station to estimate the rate of movement of the mobile station from signal fading, for example, from changes in the TPC signal that is transmitted at prescribed intervals from the mobile station to control the transmission power of the base station. This estimated rate of mobile station movement is communicated to the transmission power controller. The operation of the other constituent elements of the embodiment illustrated in FIG. 9 is the same as that of the base station shown in FIG. 7.

Figure 10:
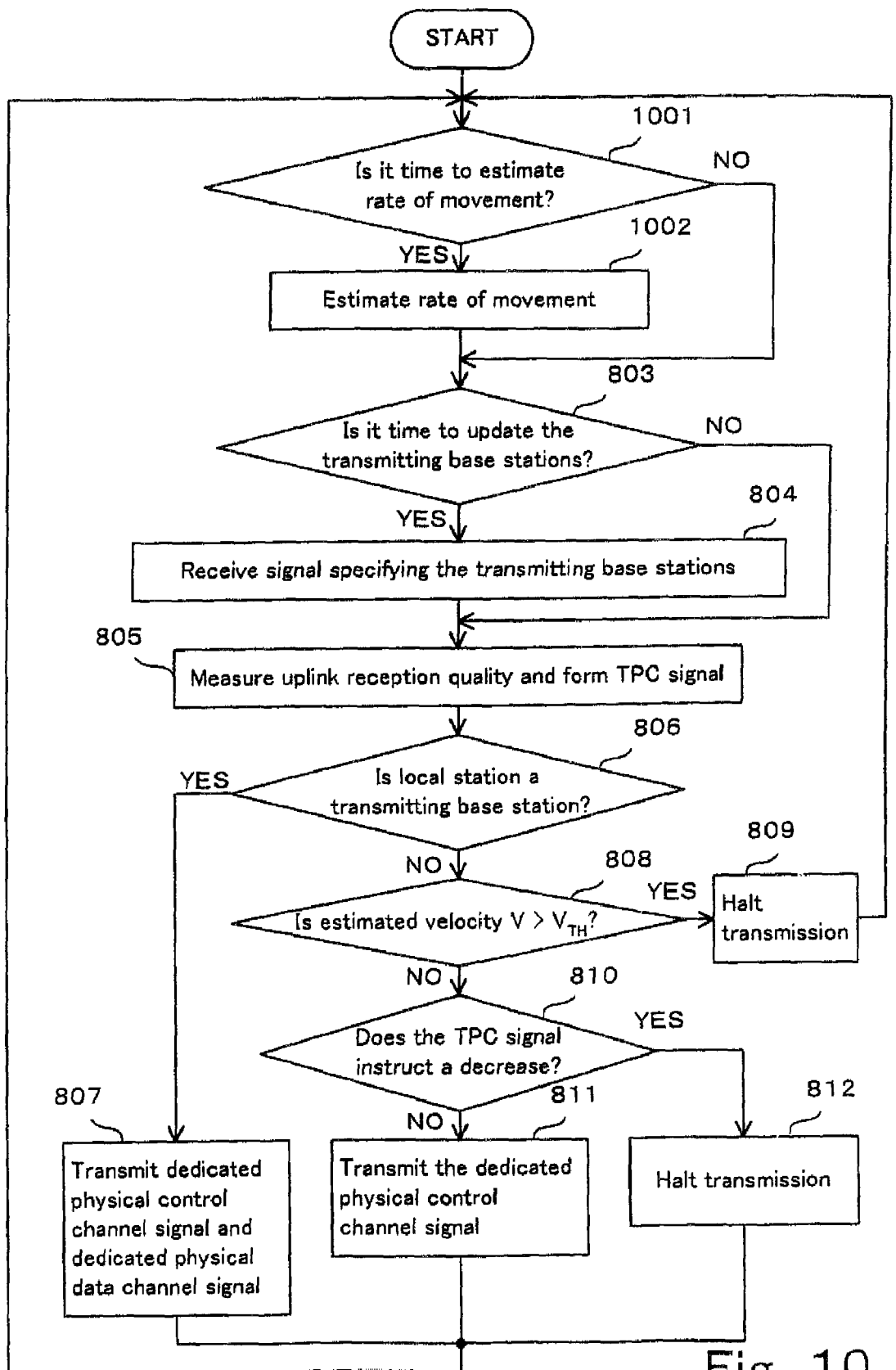
FIG. 10 is a flowchart showing the operation of a base station according to a third mode of embodying the invention.

FIG. 10 is a flowchart showing the operation of transmitting dedicated physical control channel signals and dedicated physical data channel signals from a base station according to this third embodiment of the invention. Those portions of the operation that are equivalent to portions in FIG. 8 have the same referencing numerals and will not be described again. In this third embodiment the base station does not receive a velocity information signal at prescribed intervals, as in the second embodiment whose operation is shown in FIG. 8. Instead, the base station estimates the velocity of the mobile station from changes in the TPC signal that is transmitted from the mobile station at prescribed intervals (Step 1002). The rest of the operation depicted in FIG. 10 is the same as the base station operation shown in FIG. 8.

This third mode of embodying the invention is similar to the second in that the transmission of dedicated physical control channel signals by a non-transmitting base station is invariably halted if the rate of movement of the mobile station is fast. If the rate of movement is fast, the probability of a base station at which uplink propagation loss is minimum also being the base station at which downlink propagation loss is minimum, is very high. As described above, it follows that the probability of a non-transmitting base station transmitting a TPC signal instructing a decrease becomes very small at high mobile station movement rates. Because the mobile station decreases its transmission power if there is at least one TPC signal that instructs a decrease, ceasing to transmit TPC signals instructing an increase from non-transmitting base stations has no impact on TPC control. Moreover, when the rate of movement of a mobile station is high, TPC control is unable to follow fading and hence TPC control itself has little effect. Consequently, when a mobile station is moving very quickly, completely halting the transmission of dedicated physical control channel signals from non-transmitting base stations has little impact on TPC control in the uplink and provides a significant decrease in downlink interference. When the rate of movement of a mobile station is slow, the non-transmitting base stations transmit only TPC signals that instruct a decrease. This results in uplink control which is the same as if all TPC signals were transmitted, and also provides the maximum possible decrease in downlink interference.

The present invention is not restricted to the foregoing embodiments.

For example, the method of estimating the rate of movement of the mobile station in this invention is not restricted to the methods of the embodiments, and it is feasible to use an estimate of mobile station velocity that is obtained by some other means.

Moreover, although a cellular system based on DS-CDMA was used in the foregoing embodiments, the invention is not restricted to this and other access schemes can be used.

As has been explained above, the present invention halts the transmission of dedicated physical control channel signals by non-transmitting base stations in accordance with uplink reception quality or in accordance with the content of the transmission power control signal to be transmitted in the downlink. The invention therefore does not affect transmission power control in the uplink, and can decrease interference due to the dedicated physical control channel signals that non-transmitting base stations transmit in the downlink. As a result, downlink channel capacity can be increased.

Furthermore, according to the invention, transmission of dedicated physical control channel signals by non-transmitting base stations is invariably halted when the velocity of a mobile station is very high, and completely ceasing to transmit transmission power control signals from non-transmitting base stations has little impact on transmission power control in the uplink. The invention can therefore further decrease downlink interference and greatly increase channel capacity.

What is claimed is:

1. A method for controlling transmission power of a mobile station connecting with a plurality of base stations, the method comprising:

transmitting, in a specified base station among the plurality of base stations, a transmission power control signal for the mobile station; and transmitting in any of the other base stations, a transmission power control signal for the mobile station, wherein the specified base station is allowed to transmit a transmission, power control signal to increase transmission power, and any of the other base station is not allowed to transmit a transmission power control signal for the mobile station to increase transmission power but is allowed to transmit a transmission power control signal for the mobile station to decrease transmission power.

2. A method for controlling transmission power from a base station to a mobile station, the method comprising;

transmitting a transmission power control signal for the mobile station, wherein the base station is allowed to transmit a transmission power control signal for the mobile station to increase transmission power when the base station is a transmitting base station of the mobile station, and the base station is not allowed to transmit a transmission power control signal for the mobile station to increase transmission power but is allowed to transmit a transmission power control signal for the mobile station to decrease transmission power when the base station is a non-transmitting base station of the mobile station; and receiving the transmission power control signal from the base station to the mobile station and controlling the transmission power according to the received transmission power control signal.

3. A mobile communication system comprising a mobile station and a plurality of base stations connecting with the mobile station, the plurality of base stations consisting of a specified base stations and the other base stations, wherein the specified base station transmits a transmission power control signal for the mobile station;

any of the other base stations transmits a transmission power control signal for the mobile station;

the specified base station is allowed to transmit a transmission power control signal for the mobile station to increase transmission power; and any of the other base station is not allowed to transmit a transmission control signal for the mobile station to increase transmission power but is allowed to transmit a transmission power control signal for the mobile station to decrease transmission power.

4. A mobile communication system comprising a mobile station and a base station connecting with the mobile station, wherein the base station is allowed to transmit a transmission power control signal for the mobile station to increase transmission power when the base station is a transmitting base station of the mobile station;

the base station is not allowed to transmit a transmission power control signal for the mobile station to increase transmission power but is allowed to transmit a transmission power control signal for the mobile station to decrease transmission power when the base station is a non-transmitting base station of the mobile station; and the mobile station receives the transmission power control signal from the base station to the mobile station and controls the transmission power according to the received transmission power control signal.

5. A base station connecting with a mobile station, wherein the base station is allowed to transmit a transmission power control signal for the mobile station to increase transmission power when the base station is a transmitting base station of the mobile station;

the base station is not allowed to transmit a transmission power control signal for the mobile station to increase transmission power but is allowed to transmit a transmission power control signal for the mobile station to decrease transmission power when the base station is a non-transmitting base station of the mobile station; and the mobile station receives the transmission power control signal from the base station to the mobile station and controls the transmission power according to the received transmission power control signal.

* * * * *